Patented Jan. 16, 1934

1,943,541

UNITED STATES PATENT OFFICE 1,943,541

METHOD OF RECLAIMING AND REUSING METALLIC SCRAP MIXTURES

Russell H. McCarroll and Gosta Vennerholm, Dearborn, Mich., assignors to Ford Motor Company, Dearborn, Mich., a corporation of Delaware No Drawing. Application February 4, 1930
Serial No. 425,901

8 Claims. (Cl. 219—4)

This invention relates to methods for reclaiming metals from mixtures of various metals wherein the metallic constituents are associated by a mechanical bond. The invention is particularly adapted for the reclamation of metals having a relatively high melting point from mixtures wherein the metals which it is desired to reclaim are associated mechanically by a fused bond formed by a metal or alloy having a lower melting point than the metals to be recovered.

Considered from a more specific standpoint an object of the invention is to provide a new and improved method of treating scrap metal, in general, wherein certain of the elements are firmly united by a fused metallic bond. The invention has marked advantages for, and is especially applicable to, the reclamation of welding electrode scrap material. Welding electrodes which formerly were constructed mainly of pure copper contact material, are largely manufactured, at present, under what may be termed, the modern practice of various mixtures such for example as copper-tungsten, copper-molybdenum and the like. Many examples of such mixtures may be found in various Letters Patent of the United States such as Patent No. 1,539,810 issued to Robert T. Gillethe and Patent No. 1,552,184 issued to Nathan H. Adams.

Although the main constituents of such mixtures are metals of much greater value than ordinary machine shop scrap such as steel, iron or brass, the used or worn out electrodes and the scrap material produced in the process of manufacturing or machining such electrodes has heretofore usually been discarded as junk or waste, principally because of the fact that no satisfactory or commercially practical method had been devised for separating the mechanical mixtures into their constituent elements. The present invention provides a method whereby the relatively expensive metals such as tungsten and molybdenum may be readily recovered from mechanical mixtures of which they form a part, and as the value of the materials recovered is much greater than the cost of carrying out the reclamation treatment of the present invention, great savings are effected.

In connection with the manufacture of such electrodes, there is a considerable loss of the material during the machining of the electrodes. After the electrodes have been used to a certain extent, they are so worn down that they cannot be used further and the remaining material in the electrode has heretofore been wasted. If tungsten or molybdenum is used the price of this tungsten or molybdenum in the scrapped material is very considerable so that a large saving can be made if the scrap can be reclaimed and reused. These savings result not only because the reclaimed material is cheaper to secure than new material, but also because the scrap resulting from machining new electrodes made from the reclaimed material is not wasted but may in turn be recovered by a further reclamation treatment.

In accordance with the principles of the present invention, the scrap material to be reclaimed is first placed in any suitable grinding mill and ground to a fine powder. In practice, we have found that a disc-type revolving grinding mill will accomplish this satisfactorily. The material is preferably so ground that it will pass through from a 20 to 100 mesh sieve. It will be understood that although it is stated a disc mill gives satisfactory results, the invention is not limited to the type of mill used or to the exact size of the powder to which the material is ground. The powder secured consists of small pieces of metal comprised of the particles of tungsten or molybdenum embedded in or having a surface coating of copper or copper oxide or the like.

Following the grinding operation the powder is subjected to a reducing treatment, preferably in a hydrogen furnace, in order to deoxidize the particles. Any copper oxide surrounding the particles is therefore reduced to pure copper. In actual practice we have found that highly satisfactory results are obtained by placing the powder in a deoxidizing furnace wherein it is subjected to a temperature of about 1000° centigrade for approximately 15 minutes. It will be understood that although the above described reducing treatment has proven successful the invention is not limited to the specific details of the process described. The material so recovered may be formed into electrodes or other articles as described. It will be understood that virgin metal may be added as required to secure a mixture or composition of the desired properties. If electrodes are to be formed the material ordinarily is die-pressed into the proper shape for the electrodes. These electrodes may be sintered if desired and saturated with copper. The copper used for such saturation may be impregnated into the sintered electrode by immersing the electrode in a molten bath of copper, or it may comprise solely the copper film which surrounds the individual particles of tungsten. Sufficient copper is utilized in these films so that the copper coated tungsten particles manufactured by the previously disclosed process may be pressed into electrodes and then sintered to produce an improved electrode without the addition of further copper, the copper of saturation being obtainable from the copper film surrounding each electrode. A copper matrix will thereby be obtained, the individual cellular units of which are more intimately connected with each other, to thus increase the electrical conductivity of the electrode. Experiments have shown that material reclaimed as above set forth may be mixed in practically any per cent from 1 to 99 with new material with satisfactory results.

Throughout this specification copper and tungsten and molybdenum have been mentioned but it will be understood that the invention is applicable to any metals having similar properties. For instance, silver except for its cost is a very satisfactory substitute for copper. Any metallic mixtures in which the metals have a very high fusion point fall within the purview of the invention, as well as tungsten and molybdenum mixtures hereinbefore referred to. The invention therefore is not limited for reclamation of electrodes or scrap from electrodes as the method of reclaiming and reusing metal herein disclosed is adapted for the reclaiming and reusing of practically any mechanical mixture of metals wherein the constituents are bound together by a fused binding material.

Many advantages arise from the use of the invention for reclaiming and reusing electrode scrap. For instance, it cuts down the price of electrodes made from new material, because there is practically no scrap material in connection with their manufacture. The electrodes made from the reclaimed material are much cheaper than the electrodes made from new material. Moreover, tests conducted on electrodes made from the reclaimed material indicate that they are equal to electrodes made from virgin metal.

It will be understood that changes, variations and modifications of the process herein disclosed, may be resorted to, as for example, with respect to the time and temperature of the deoxidizing furnace without departing from the spirit of our invention, and it is our intention to cover by our claims such changes as may reasonably be included within the scope of the invention.

We claim as our invention:

1. The method of forming welding electrodes consisting of subjecting a powder composed of relatively hard metallic particles coated with an oxide of a softer metal to a reducing atmosphere, whereby said oxide coating is reduced to pure metal, then pressing said powder in dies to the shape of an electrode, and then sintering said electrode, said coatings forming an intimately connected cellular matrix.

2. The method of forming welding electrodes consisting of subjecting a powder composed of tungsten particles coated with copper oxide to a reducing atmosphere whereby said oxide is converted to pure metallic copper, then pressing said powder in said dies to the shape of an electrode, and then sintering said electrode, said copper coatings forming an intimately connected cellular matrix of high current conductivity.

3. A method of reclaiming scrap pieces of welding electrodes which are composed of a sintered mass of tungsten particles impregnated with copper, consisting of grinding said pieces to a powder which will pass through a 20-mesh sieve, the individual particles of said powder consisting of tungsten particles coated with copper oxide, then reducing said copper oxide coating to a metallic copper coating, then pressing said powder in dies to the shape of an electrode, and then sintering said electrode, whereby said coatings will form an intimately connected cellular matrix of high electrical conductivity.

4. The method of forming welding electrodes consisting of subjecting a powder composed of relatively hard metallic particles to a reducing atmosphere, said particles being coated with both a film of a softer metal and an oxide film of said softer metal, whereby said oxide coating is reduced to pure metal, then pressing said powder in dies to the shape of an electrode, and then sintering said electrode, said softer metal forming an intimately connected cellular matrix.

5. The method of forming welding electrodes consisting of subjecting a powder composed of tungsten particles to a reducing atmosphere, said particles being coated with both a film of copper and a film of copper oxide, whereby said oxide coating is reduced to pure copper, then pressing said powder in dies to the shape of an electrode, and then sintering said electrode, said copper coatings forming an intimately connected cellular matrix of high current conductivity.

6. A method of reclaiming scrap pieces of welding electrodes which are composed of a sintered mass of tungsten particles impregnated with copper, consisting of grinding said pieces to a powder, the individual particles of said powder consisting of tungsten particles coated with copper and copper oxide, then reducing said copper oxide coating to metallic copper, then pressing said powder in dies to the shape of an electrode, and then sintering said electrode, whereby said coatings will form an intimately connected cellular matrix of high electrical conductivity.

7. A method of reclaiming scrap pieces of welding electrodes, said pieces being composed of sintered masses of tungsten particles impregnated with copper, consisting of grinding said pieces to a powder, said grinding operation effecting the distribution of said impregnating copper as copper coatings upon the individual tungsten particles of said powder, then pressing said powder in dies to the shape of an electrode, and then sintering said electrode, whereby said copper coatings will form an intimately connected cellular matrix which is not appreciably broken by the sintered bonds between said particles.

8. A method of reclaiming scrap pieces of welding electrodes which are composed of sintered masses of tungsten particles impregnated with copper, consisting of comminuting said pieces to a powder, the individual particles of said powder consisting of tungsten particles coated with copper and copper oxide, then reducing said copper oxide coatings to metallic copper, then pressing said powder in dies to the shape of an electrode, and then sintering said electrode, whereby said coatings will form an intimately connected cellular matrix of high electrical conductivity.

RUSSELL H. McCARROLL.
GOSTA VENNERHOLM.